(12) United States Patent
Mizue (10) Patent No.: US 7,606,497 B2
(45) Date of Patent: Oct. 20, 2009

(54) PLUGGABLE TRANSCEIVER HAVING GUIDE STRUCTURE FOR CONNECTOR WITHIN CAGE

(75) Inventor: Toshio Mizue, Yokohama (JP)

(73) Assignee: Sumitomo Electric Industries Ltd., Osaka (JP)

( * ) Notice: Subject to any disclaimer, the term of this patent is extended or adjusted under 35 U.S.C. 154(b) by 489 days.

(21) Appl. No.: 11/476,208

(22) Filed: Jun. 28, 2006

(65) Prior Publication Data

US 2007/0019963 A1  Jan. 25, 2007

(30) Foreign Application Priority Data

Jun. 28, 2005 (JP) .......................... P2005-188436

(51) Int. Cl.
*H04B 10/00* (2006.01)
(52) U.S. Cl. .................. 398/135; 398/138; 398/164; 398/128

(58) Field of Classification Search ................. 398/135, 398/138, 164, 128, 130
See application file for complete search history.

(56) References Cited

U.S. PATENT DOCUMENTS 6,335,869 B1 * 1/2002 Branch et al. ................ 361/816
6,439,918 B1   8/2002 Togami et al.

\* cited by examiner

*Primary Examiner*—M. R. Sedighian
(74) *Attorney, Agent, or Firm*—Smith, Gambrell & Russell, LLP (57) ABSTRACT

The present invention provides an optical transceiver for readily engaging a plug of a circuit board with a connector. The optical transceiver is provided with a pair of guides for guiding the plug to the connector while contacting the outer side faces of the connector disposed on a host board. The connector is contained in a cage provided on the host board. When the optical transceiver is inserted into the cage, the guides contact the outer side faces of the connector to define the position of the optical transceiver relative to the connector, whereby the plug is smoothly guided to the connector.

5 Claims, 8 Drawing Sheets

PLUGGABLE TRANSCEIVER HAVING GUIDE STRUCTURE FOR CONNECTOR WITHIN CAGE

BACKGROUND OF THE INVENTION

1. Technical Field

The present invention relates to a pluggable optical transceiver to be engaged with a cage arranged on a host board, for example, and more particularly to a stable engagement mechanism between an electric connector arranged in a cage and a plug of an optical transceiver.

2. Related Prior Art

The conventional structure known in this field includes the optical transceivers disclosed in U.S. Pat. No. 6,335,869 and U.S. Pat. No. 6,439,918. The optical transceivers described in these publications have a circuit board having a plug to be engaged with a connector on a host board, and a housing which contains this circuit board. The circuit board is positioned and fixed in the housing. On the other hand, a cage, into which the optical transceiver is to be inserted, is fixed on the host board, and the connector is fixed at the deep end of this cage on the host board. It is possible to transfer signals and/or electrical power between the host system and the optical transceiver by inserting the optical transceiver into the cage and engaging the plug of the optical transceiver with the connector. Therefore it is important to ensure the dimensional accuracy of the gap between the outer surface of the housing of the optical transceiver and the inner surface of the cage and to ensure the relative positional accuracy between the cage and the connector.

However, small deviation of relative positions between the connector and the cage sometimes causes unsuccessful engagement between the connector and the plug. For example, upon the engagement between the conventional connector and plug, the gap between the outer surface of the housing of the transceiver and the inner surface of the cage is set to such dimensions that the plug is appropriately guided within the width of the connector. If this gap is set large, the plug comes off the plug-engaging part of the connector. In that situation, the plug and the connector is unable to smoothly engage to each other even if the transceiver is pushed into the cage. This gap is ruled within 0.7 mm by the standard, i.e., MSA (Multi-source Agreement).

This condition for the engagement is not met when deviation occurs in the relative positional relationship between the connector and the cage, too. That is, even if the gap ruled by the aforementioned MSA is correctly set, the plug may touch the edge of the connector, i.e., portions other than the plug-engaging part of the connector, so as to hinder the engagement between the connector and the plug when there is even a small deviation of 0.17 mm in the relative positions between the connector and the cage.

The cage is fabricated by cutting and bending a single metal plate. With repeated insertions and extractions of the transceiver, the cage can be deformed by stress applied during the insertions and extractions, and thus the plug and the connector can fail to engage. Furthermore, with a multi-cage structure in which a plurality of cages are disposed adjacent to each other, when optical transceivers are inserted into the adjacent cages, a partition between the cages can be deformed, and the plug and the connector can fail to engage.

The present invention has been accomplished in order to solve the problem as described above, and an object of the invention is to provide an optical transceiver enabling a plug on a circuit board to be readily engaged with a connector.

SUMMARY OF THE INVENTION

An optical transceiver according to the present invention is a so-called pluggable transceiver and is arranged to be inserted into a cage mounted on a host board and to be engaged with a connector provided at an innermost end of the cage on the host board. The optical transceiver has an optical element, a circuit board, and a housing containing these optical element and circuit board. The circuit board is electrically connected to the optical element at one end, and has a plug to be engaged with the connector at another end opposite to the one end. A guide according to the present invention has a function of contacting an outer side face of the connector and appropriately guiding the plug to the connector upon inserting the transceiver into the cage to engage the plug with the connector.

The housing may have a metal cover having a bottom surface and a pair of side portions standing upright from the bottom surface, and the guide may be a pair of folds obtained by bending said other ends of the pair of side portions each toward the opposite side portion. The plug can be smoothly guided to the connector when the distance between the distal ends of the folds is set smaller than the total width of the connector, and when the distance between the bent portions of the folds is set larger than the total width of the connector.

Preferably, the distal end of each fold is again bent toward the exterior of the housing to have a section shaped in an arc, and the distance between the tops of the arcs is set smaller than the total width of the connector to make a contact area narrow between the folds and side faces of the connector. The plug is smoothly guided to the connector, and upon pulling the transceiver out of the cage, the guide smoothly contacts the side faces of the connector.

The housing may include a metal cover having a bottom surface, and a frame having a pair of side walls, and the guide may include extensions extending from the rear end side of the pair of side walls of the frame toward the bottom surface. The cross section of each extension is in a trapezoidal shape having a short side, a long side, and an oblique side, the short side is located at the leading end of the extension, and the oblique side is located on the rear end side of the housing. The oblique sides serve as a guide for the connector upon engaging the plug with the connector when the distance between the short sides is set to be equal to the total width of the connector, and when the distance between the long sides is set wider.

DESCRIPTION OF THE PREFERRED EMBODIMENTS

The preferred embodiments of the optical transceiver according to the present invention will be described below with reference to the drawings. In the description of the drawings identical or equivalent elements will be denoted by the same reference symbols, without redundant description.

First Embodiment

Figure 1:
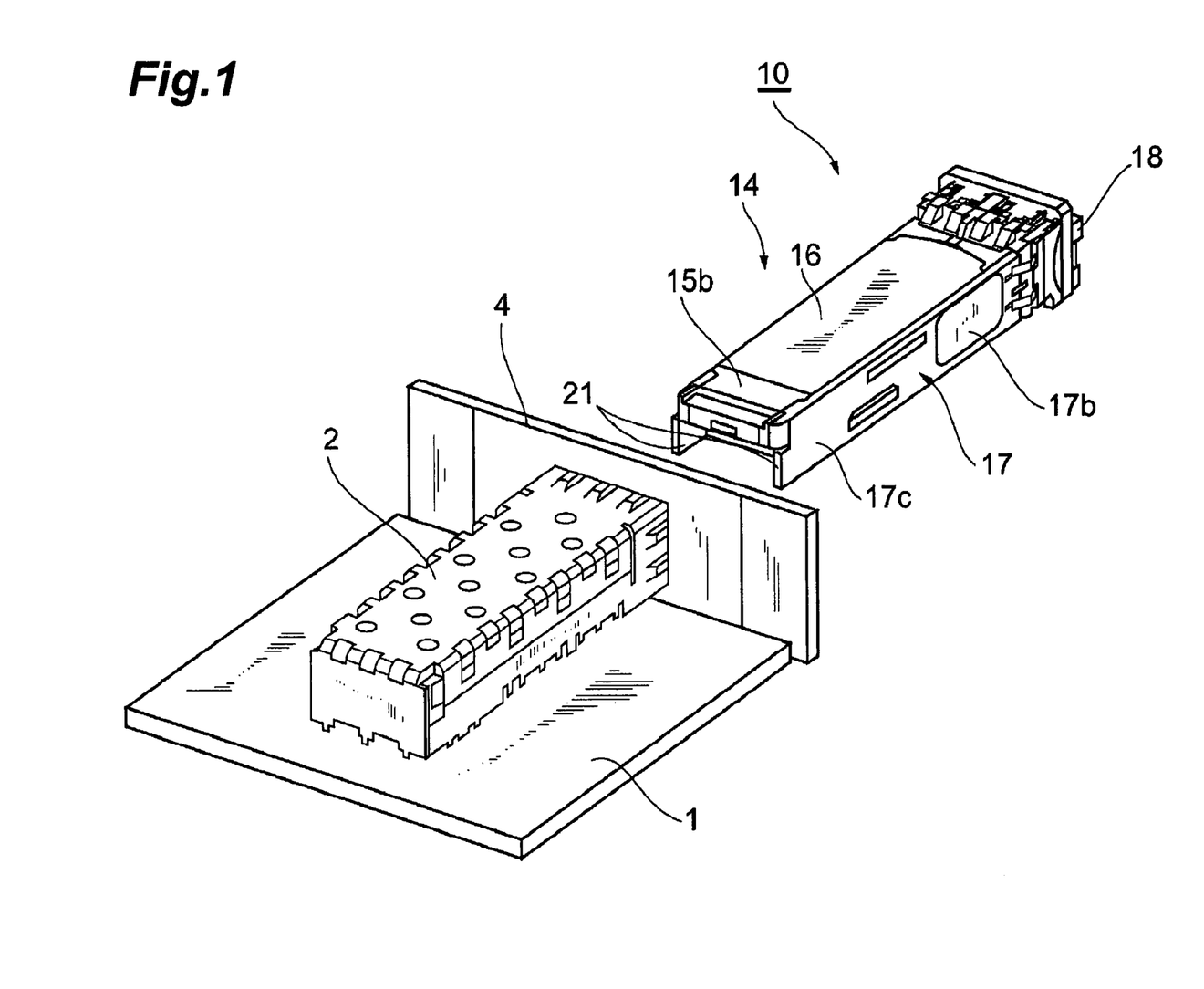
FIG. 1 is a perspective view showing a transceiver as an optical transceiver according to the first embodiment of the present invention, and also showing a host board.
Figure 2:
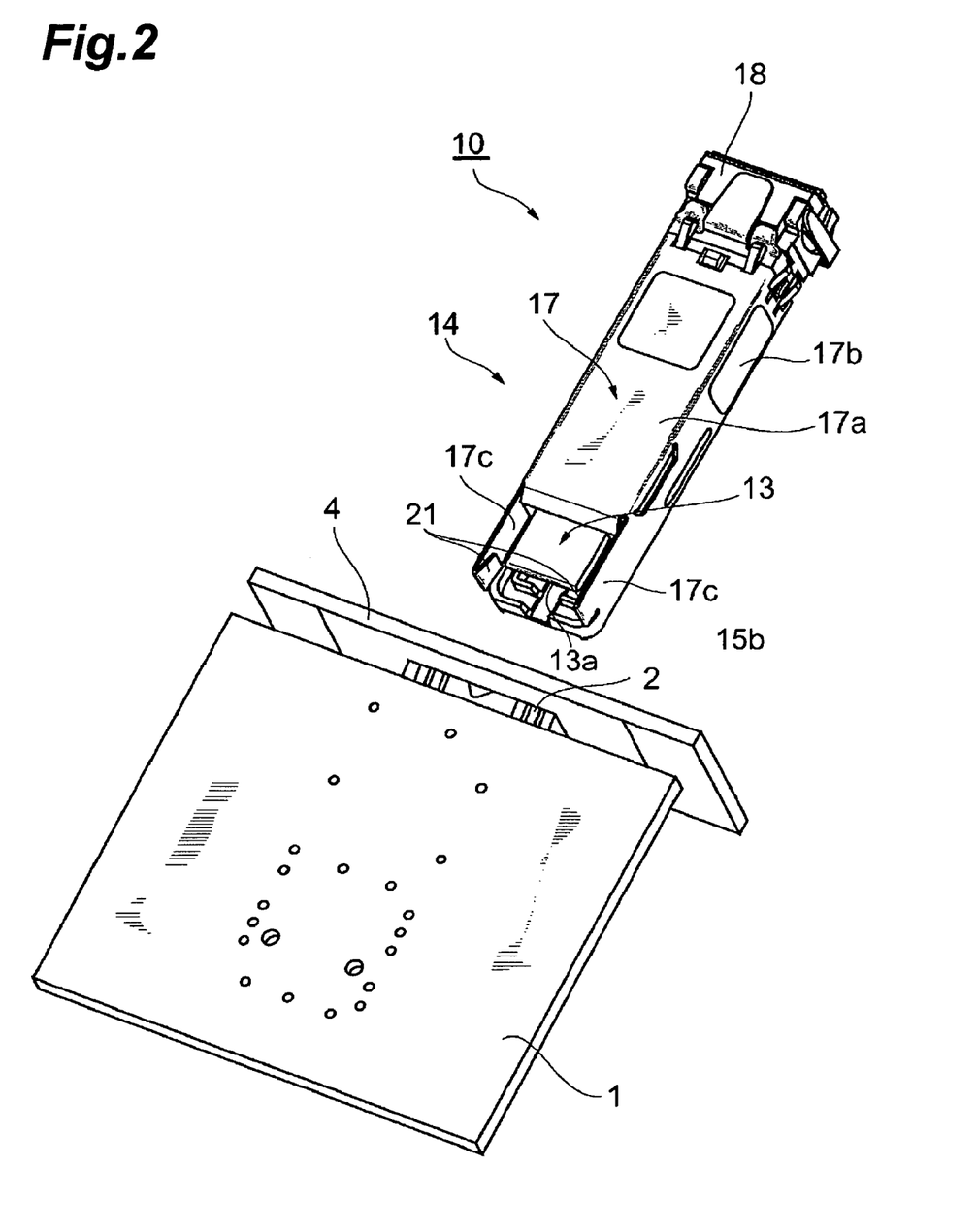
FIG. 2 is a perspective view showing the transceiver and the host board in FIG. 1 viewed from the bottom side.
Figure 3:
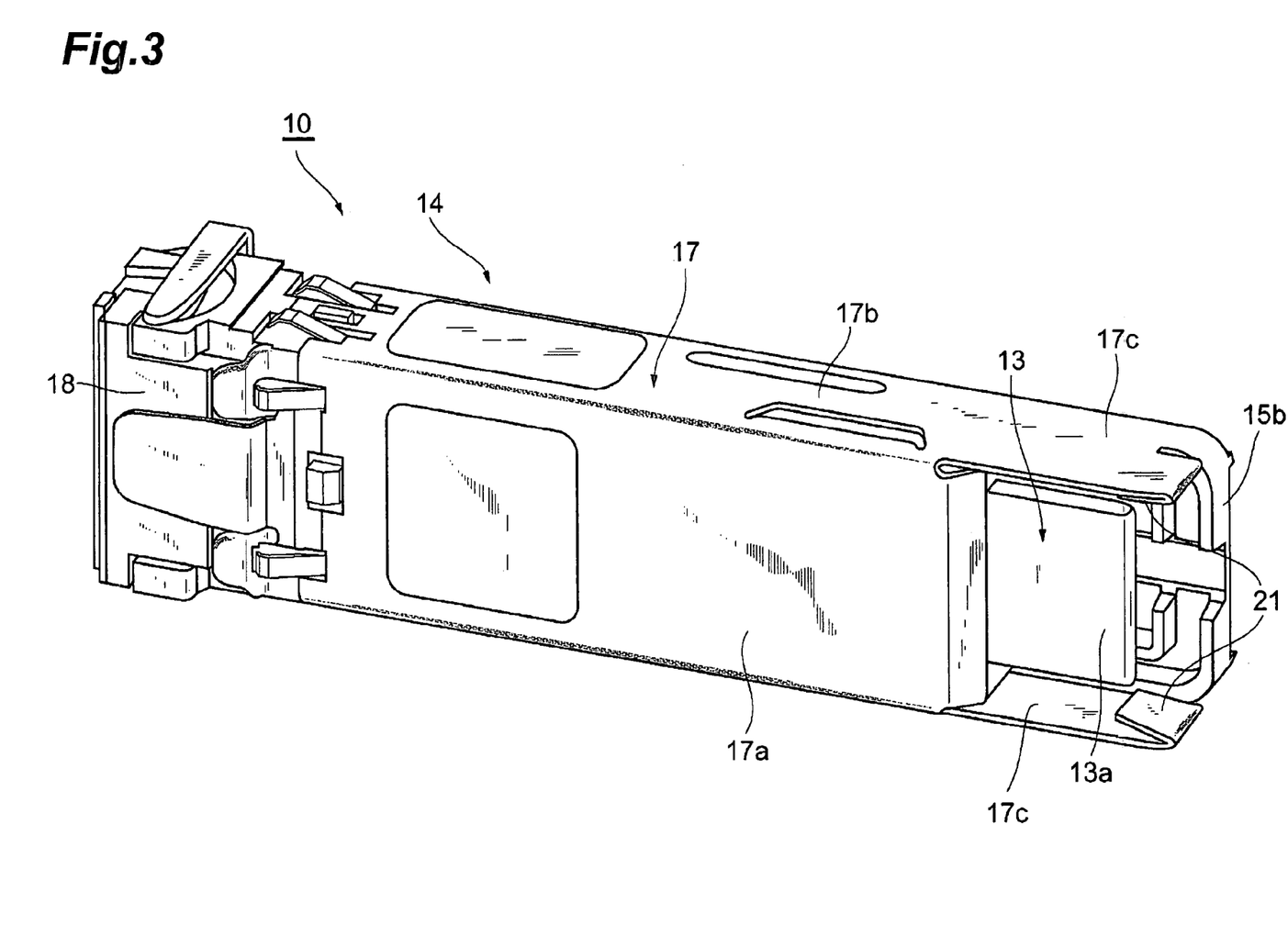
FIG. 3 is a perspective view showing the transceiver in FIG. 1, viewed from the bottom side.

FIGS. 1 to 5 show the optical transceiver according to the first embodiment of the present invention. As shown in FIG. 1, the optical transceiver 10 is a pluggable transceiver. The transceiver 10 is used as being inserted in a metal cage 2 installed on a host board 1. A plug provided at the rear end of the transceiver 10 is disposed at the deep end in the cage 2, and is engaged with a connector 3 fixed on the host board 1 (see FIG. 5). The front end of the cage 2 around an optical receptacle 18 is in contact with a panel 4, whereby the entire cage is kept at the ground potential to electromagnetically shield the optical transceiver 10.

Figure 4:
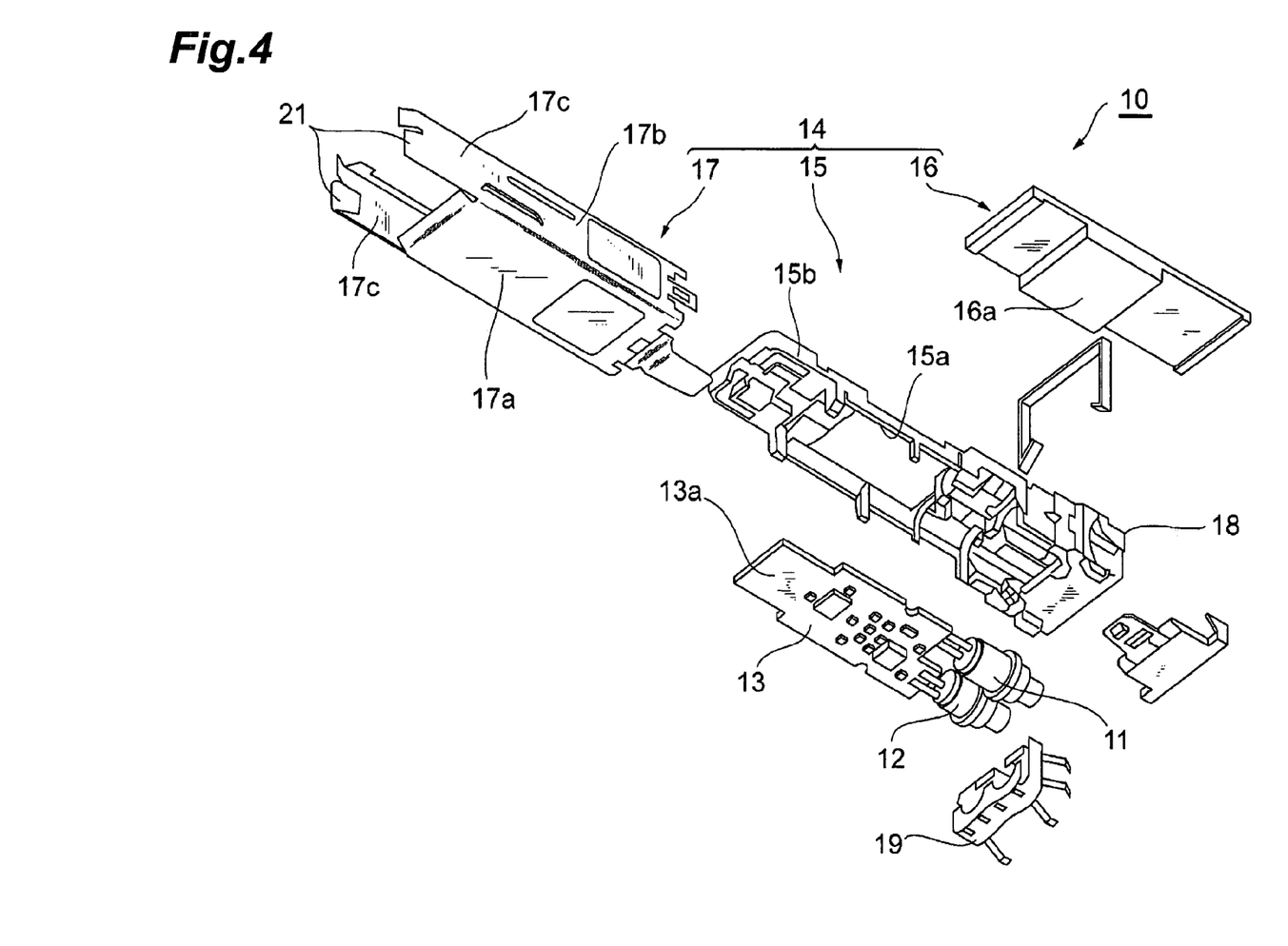
FIG. 4 is an exploded perspective view showing the transceiver in FIG. 1, viewed from the bottom side.
Figure 5:
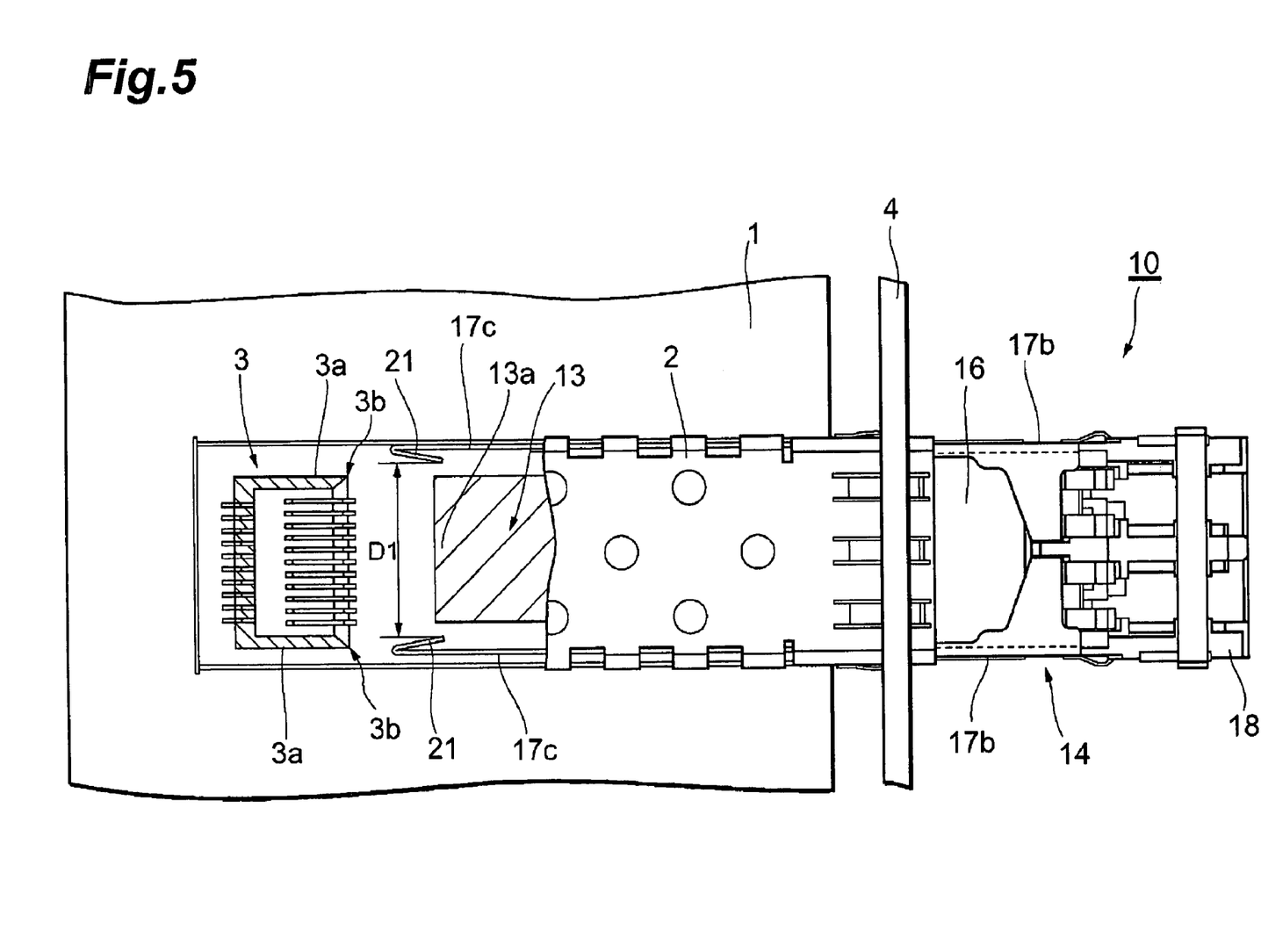
FIG. 5 is a partially sectional, partly broken view showing the transceiver in FIG. 2 and a connector.

The transceiver 10, as shown in FIG. 4, is provided with a Transmitter Optical Sub-Assembly 11 (TOSA) installing a light-emitting device, a Receiver Optical Sub-Assembly 12 (ROSA) installing a light-receiving device, a circuit board 13 mounting an electronic circuit thereon, and a housing 14 for enclosing these TOSA 11, ROSA 12, and circuit board 13. The electronic circuit is electrically connected to the TOSA 11 and the ROSA 12.

The housing 14 includes a frame 15 forming a primary body of the transceiver 10, a heat-dissipating block 16 constituting an upper wall of the transceiver 10 and dissipating heat from the circuit board 13, and a cover 17 having a bottom surface 17a and a pair of side walls 17b perpendicular to this bottom surface 17a. The frame 15 is, for example, made of resin, and the cover 17 is made of metal.

The frame 15 is integrally built with an optical receptacle 18 for receiving an optical connector to be optically coupled to the TOSA 11 and ROSA 12. In the central region of the frame 15 is formed with an opening defined by a pair of side walls 15a. The heat-dissipating block 16 has a thick portion 16a and thin portions located on both sides of this thick portion 16a, and the thick portion 16a is fitted into the opening of the frame 15 to contact electronic circuit components mounted on the circuit board.

In the optical transceiver 10, the side where the optical receptacle 18 is formed will be called a front side, and the other side will be called a rear side. Lead pins drawn out from the TOSA 11 and ROSA 12 are fixed on the front end of the circuit board 13. A plug 13a to be engaged with the connector 3 on the host board is provided at the rear end of the circuit board 13, and wirings formed on the circuit board 13 extend onto the plug 13a. The circuit board 13, TOSA 11, and ROSA 12 are fixed to the frame 15. The TOSA 11 and ROSA 12 are located at predetermined positions in the housing 14 and their outer surfaces come in contact with the inner surface of the cage 2 by a tab plate 19, so that the TOSA 11 and ROSA 12 are maintained at the ground potential.

The bottom surface 17a of the cover 17 is shorter than the side walls 17b thereof in the longitudinal direction of the transceiver 10 in order to expose the plug 13a. Namely, each side wall 17b has an extension 17c extending backward from the bottom surface 17a, and the leading end of this extension 17c projects backward from the plug 13a (see FIG. 3). On the other hand, the upper side of the plug 13a is protected by a rear end 15b of the frame 15 extending to the rear end of the transceiver 10. The plug 13a is exposed only on the lower side, and the upper side thereof is covered by the rear end 15b of the frame.

The cover 17 has a pair of guides 21 for contacting the front-end corners (edges) 3b (see FIG. 5) of the outer side faces 3a of the connector 3 and guiding the plug 13a to the connector 3 upon the engagement between the plug 13a and the connector 3. The guides 21 are formed at the rear ends of the extensions 17c so as to sandwich the outer side faces 3a of the connector 3.

The guides 21 are integrally formed with the cover 17 by stamping a single metal sheet. The guides 21 are bent from the rear ends of the extensions 17c to the inside of the transceiver 10. Namely, the pair of guides 21 are formed so that the distance between the guides 21 decreases toward the front side of the housing 14. The guides 21 are formed, for example, approximately at the same height from the lower end of the transceiver 10 in the vertical direction as the connector 3 is. The distal ends of the guides 21 are located forward with respect to the rear end of the circuit board 13. In consideration of dimensional variation of the cover 17, distance D1 between the distal ends of the guides 21 is set just smaller than the total width of the connector 3, whereby the effect of the present invention can be achieved.

The transceiver 10 is inserted from the rear end side (plug 13a side) into the cage 2. When there is some deviation in the positional relation between the connector 3 and the plug 13a because of the deviation in the mounted position of the connector 3 in the cage 2 from the predetermined location, the guides 21 will contact the corners 3b of the connector 3. Then the guides 21 will be elastically deformed, and the position of the transceiver 10 will be adjusted by the repulsion from the guides 21. The plug 13a is guided to the connector 3 to achieve smooth engagement between the plug 13a and the connector 3.

Thus, even if the position of the connector 3 is located with some deviation from the designed position on the host board 1, the plug 13a of the transceiver 10 is guided by the guides 21 to be engaged with the connector 3, so that it is unnecessary to position and fix the connector 3 to the host board 1 at a high precision. Since the pair of guides 21 formed integrally with the metal cover 17 by stamping are used as means for guiding the plug 13a to the connector 3, the cost for making the guides 21 can be kept low.

Second Embodiment

Figure 6:
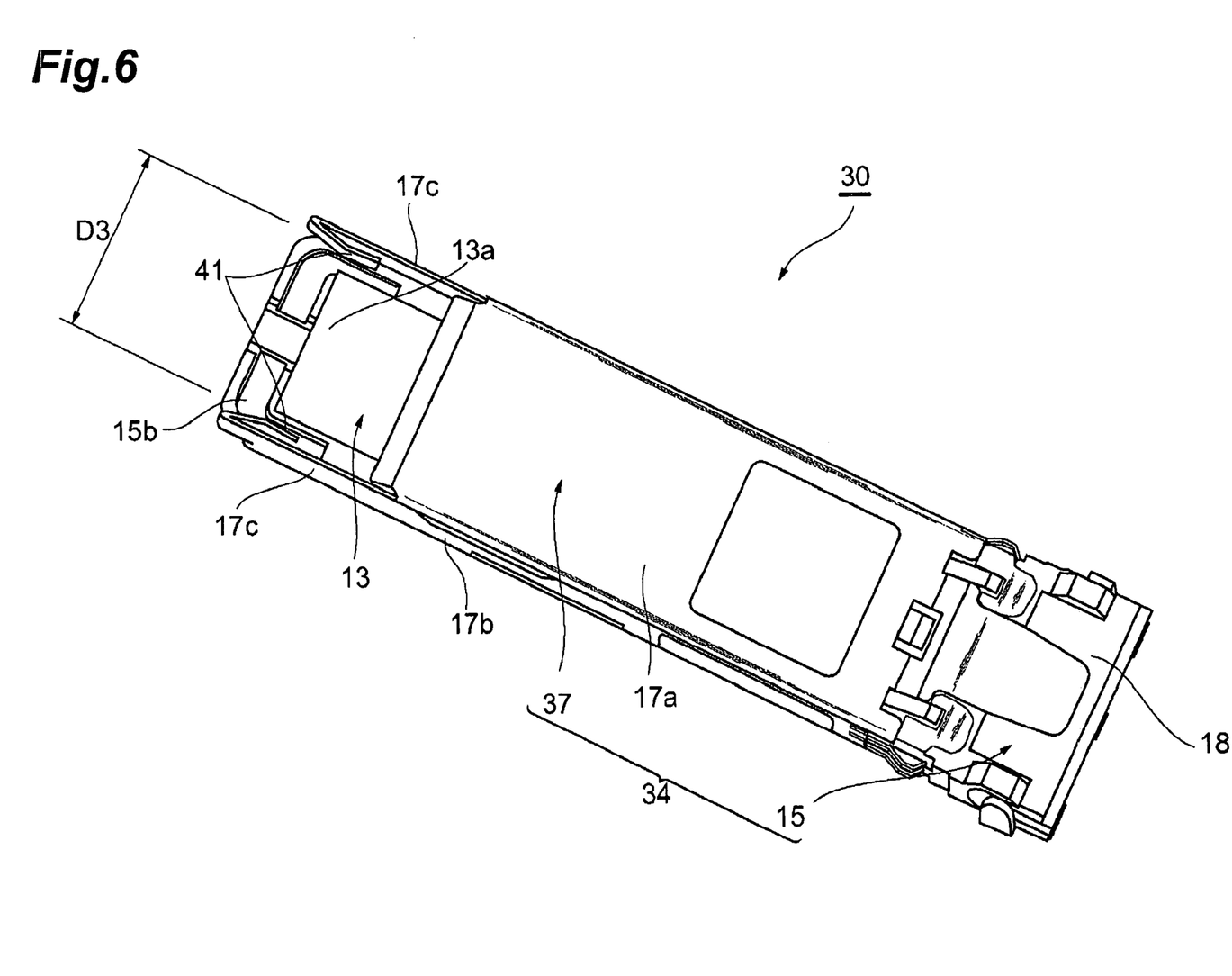
FIG. 6 is a perspective view showing a transceiver as an optical transceiver according to the second embodiment of the present invention, viewed from the bottom side.

The transceiver according to the second embodiment of the present invention will now be described with reference to FIG. 6. FIG. 6 is a perspective view of the transceiver according to the second embodiment of the present invention, viewed from the bottom side. The transceiver 30 of the second embodiment is different from the transceiver 10 of the first embodiment in that a housing 34 with another form is used instead of the housing 14.

A pair of guides 41 come in contact with the outer side faces 3a (see FIG. 5) of the connector 3 upon the engagement between the plug 13a and the connector 3. These guides 41 are formed at the rear ends of the extensions 17c of the cover 17 so as to sandwich the outer side faces 3a of the connector 3. Each guide 41 is formed integrally with the cover 17 by pressing a metal sheet, and is bent inward from the rear end of the extension 17c of the side wall 17b. The pair of guides 41 is formed so that the distance between the guides 41 narrows and then widens from the rear end of the cover 17 toward the front. The distal end of each guide 41, i.e., the distal end of each fold obtained by bending the rear end of the extension 17c to the inside is located on the front side with respect to the rear end of the circuit board 13. Taking in consideration of dimensional variation of the cover 17, distance D3 between the tops of the folds of the guides 41 is set just smaller than the total width of the connector 3.

This configuration can also achieve the same effect as the transceiver 10 of the first embodiment. In addition, upon disengaging the plug 13a from the connector 3 and pulling the optical transceiver 30 out of the cage 2, the transceiver 30 comes in contact with the connector at only the protrusions of the inwardly bent guides 41, whereby the transceiver 30 can be smoothly drawn out.

Third Embodiment

Figure 7:
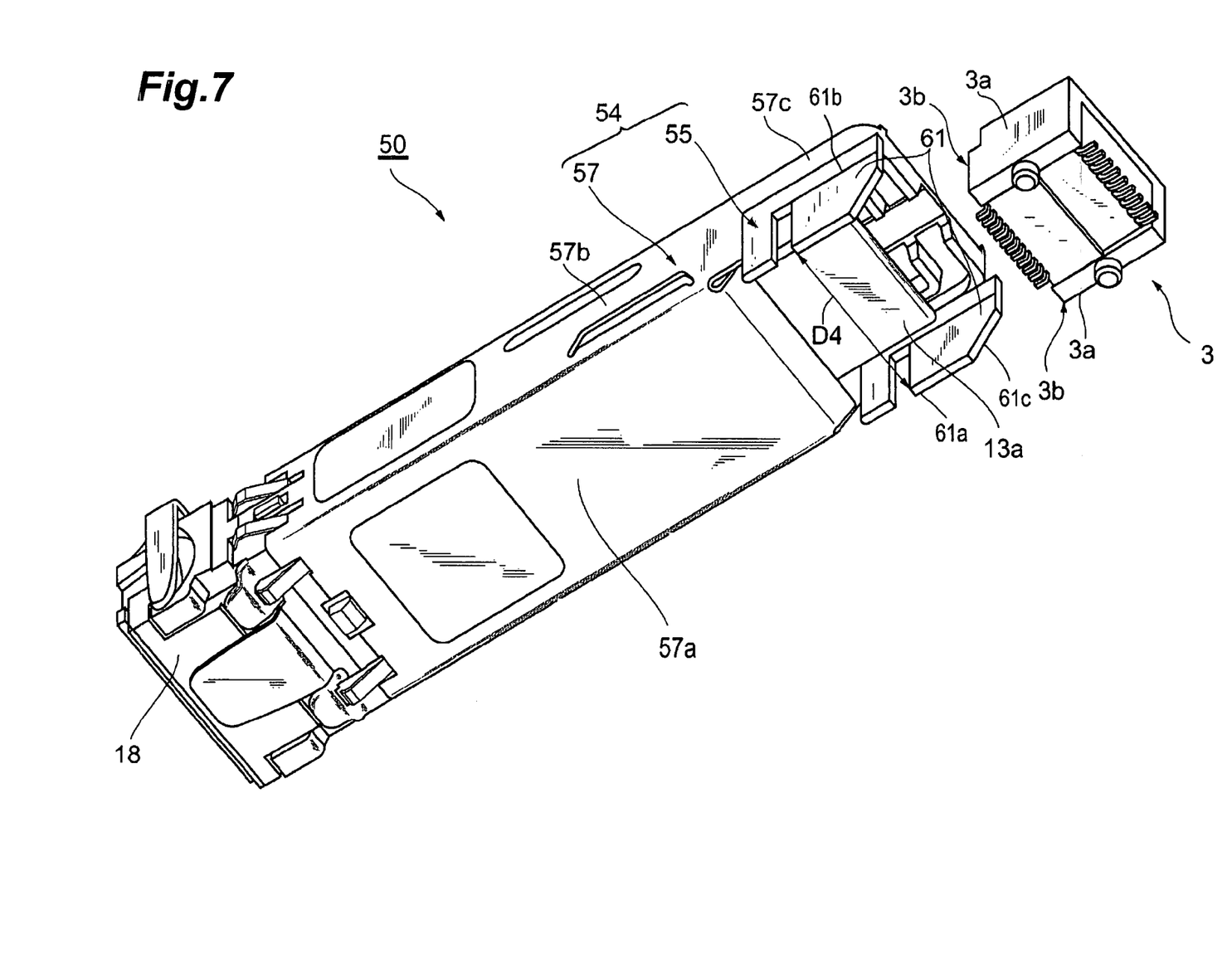
FIG. 7 is a perspective view showing a transceiver as an optical transceiver according to the third embodiment of the present invention, and a connector, viewed from the bottom side.
Figure 8:
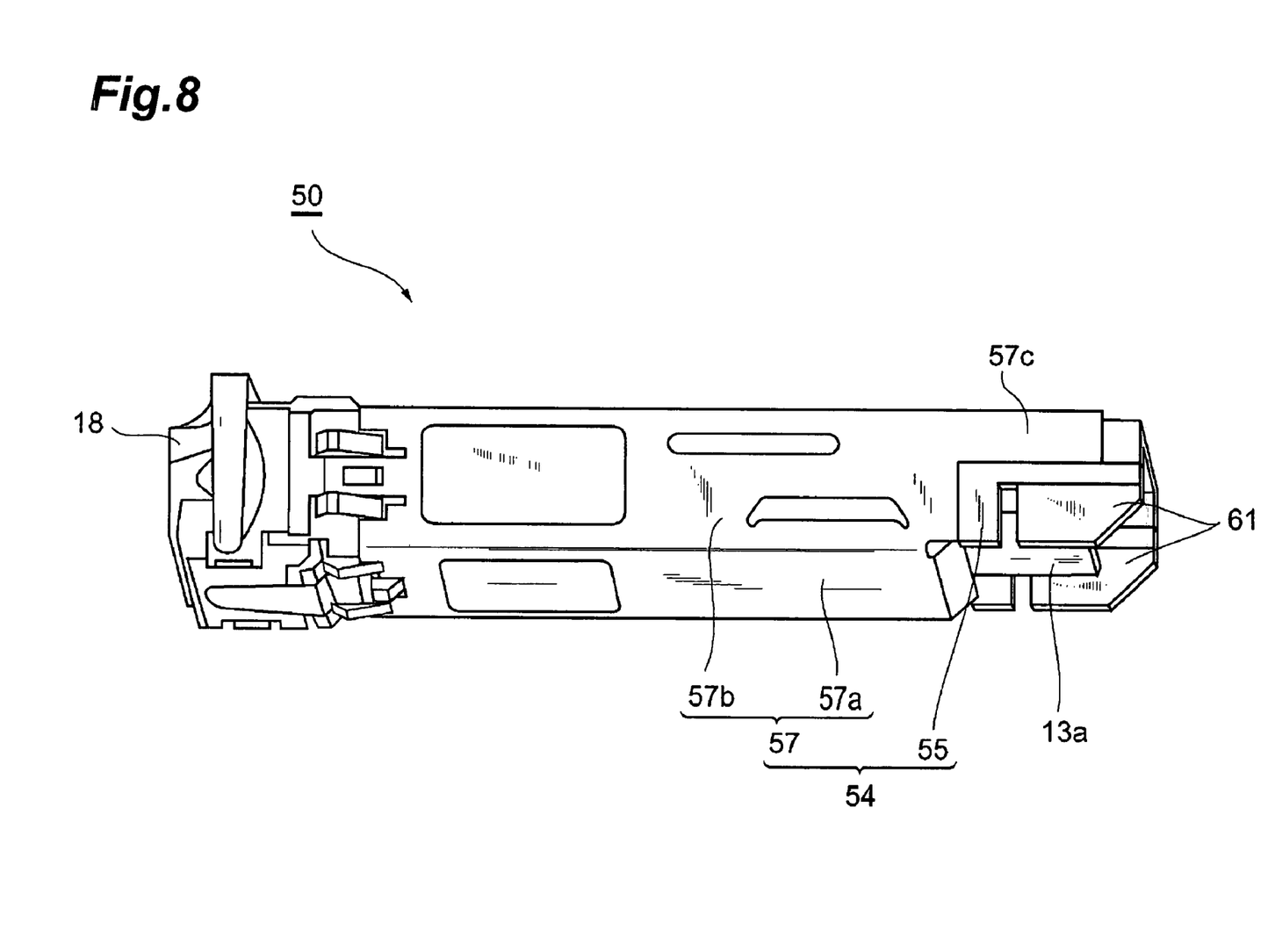
FIG. 8 is a perspective view showing the transceiver shown in FIG. 7, viewed from the side.

FIGS. 7 and 8 are perspective views showing the transceiver according to the third embodiment of the present invention. The transceiver 50 of the third embodiment is different from the transceiver 10 of the first embodiment in that the transceiver 50 has a housing 54 with guides 61 of another form, instead of the guides 21. The guides 21 in the first embodiment are provided in the cover 17, whereas the guides 61 in the present embodiment are provided at the rear end of a frame 55.

A metal cover 57 has a bottom surface 57a and a pair of side walls 57b perpendicular to this bottom surface 57a. The bottom surface 57a is shorter than the side walls 57b, and this results in exposing the plug 13a at the rear end of the transceiver 50. Each side wall 57b has an extension 57c on the rear end side, and this extension 57c is formed in a small vertical width, so as to expose the guides 61 provided on the frame 55 below the extension, i.e., on the side of the bottom surface 57a.

Upon engaging the plug 13a with the connector 3, the guides 61 contacts the front-end corners (edges) 3b of the outer side faces 3a of the connector 3, to guide the plug 13a to the connector 3. More specifically, the guides 61 are formed integrally with the frame 55, and extend downward from both sides of the frame 55 on the rear end of the frame 55 with the distal ends of the guides bent inward. The side face of each guide 61 has a trapezoidal shape obtained by cutting the lower corner on the rear end of a rectangle. Distance D4 between the short sides 61a of the trapezoid is set as narrow as, almost equal to the total width of the connector 3, while the distance between the long sides 61b of the trapezoid is wider than the total width of the connector 3. The lower ends of the guides 61 are set in a height thereof enough to come in contact with the outer side faces 3a of the connector 3 when the plug 13a is engaged with the connector 3.

When this optical transceiver 50 is inserted into the cage 2 to engage the plug 13a with the connector 3, the long sides 61b of the guides 61 first act on the connector 3 because the corners at the rear ends of the guides 61 are cut off. Since the distance between the long sides 61b is set wider than the total width of the connector 3, the long sides 61b can surely sandwich the connector 3 therebetween. When the transceiver 50 is further pushed into the cage 2, the guides 61 come to act on the entire width of the connector 3 along oblique sides 61c. Since distance D4 between the short sides 61a is set to be equal to the total width of the connector 3, the plug 13a can be smoothly guided to the connector 3. Namely, the oblique sides 61c of the cut-outs of the guides 61 act as the guides 21 and 41 in the first and second embodiments. If distance D4 between the short sides 61a is smaller than the total width of the connector 3, the repulsion from the guides 61 is preferably about 2 Newton in a state in which the plug 13a is fitted to the connector 3.

The present invention has been described in detail based on the embodiments thereof, but it is noted that the present invention is by no means intended to be limited to the above embodiments. The guides may be in any structure that is able to guide the plug 13a to the connector 3 while contacting the outer side faces 3a of the connector 3.

What is claimed is:

1. An optical transceiver to be inserted into a cage mounted on a host board and to be engaged with a connector provided at an innermost end of the cage on the host board, comprising:
   an optical element;
   a circuit board electrically connected to the optical element at one end, the circuit board having a plug to be engaged with the connector at another end opposite to the one end; and
   a housing containing the optical element and the circuit board, the housing having a metal cover with a bottom surface and a pair of side portions standing upright from the bottom surface, the pair of side portions each being bent toward its respective opposite side portion to form a pair of folds with distal ends as a guide at a side of the other end;
   upon engaging the plug with the connector, the guide contacting an outer side face of the connector to guide the plug to the connector,
   wherein the distal ends of the pair of folds has a distance smaller than the total width of the connector.

2. The optical transceiver according to claim 1, wherein the distal ends of the pair of folds are located away from the rear end of the circuit board toward the one end.

3. The optical transceiver according to claim 1, wherein the folds are bent at the leading ends thereof toward an inside of the housing so that a section of each fold is shaped in an arc, and a distance between tops of the arcs is smaller than a total width of the connector.

4. An optical transceiver to be inserted into a cage mounted on a host board and to be engaged with a connector provided at an innermost end of the cage on the host board, the optical transceiver comprising:
   an optical element;
   a circuit board electrically connected to the optical element at one end, the circuit board having a plug to be engaged with the connector at another end opposite to the one end;
   a housing containing the optical element and the circuit board, the housing having a guide at a side of the other end and including a metal cover and a frame, the metal cover having a bottom surface, and the frame having a pair of side walls;
   upon engaging the plug with the connector, the guide contacting an outer side face of the connector to guide the plug to the connector,
   wherein the guide includes extensions extending from a rear end side of the respective side walls of the frame toward the bottom surface, a cross section of each extension is in a trapezoidal shape having a short side, a long side, and an oblique side, the short side being located at a leading end of the extension, and the oblique side being located on the rear end side, and wherein the extensions have a distance in the short side thereof substantially equal to a total width of the connector, and have another distance in the long side thereof wider than a total width of the connector.

5. The optical transceiver according to claim 4, wherein the frame is made of resin.

* * * * *